United States Patent
Kim et al.

(10) Patent No.: US 12,543,766 B2
(45) Date of Patent: Feb. 10, 2026

(54) COMPOSITION FOR INHIBITING HMF PRODUCTION COMPRISING ALLULOSE DISACCHARIDE

(71) Applicant: CJ CHEILJEDANG CORPORATION, Seoul (KR)

(72) Inventors: Minhoe Kim, Seoul (KR); Jongmin Choi, Seoul (KR); Su-Jeong Kim, Seoul (KR); Youn-Kyung Bak, Seoul (KR); Sung Bae Byun, Seoul (KR); Sungkyun Lee, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 421 days.

(21) Appl. No.: 17/780,245

(22) PCT Filed: Nov. 23, 2020

(86) PCT No.: PCT/KR2020/016562
§ 371 (c)(1),
(2) Date: May 26, 2022

(87) PCT Pub. No.: WO2021/107526
PCT Pub. Date: Jun. 3, 2021

(65) Prior Publication Data
US 2023/0018775 A1  Jan. 19, 2023

(30) Foreign Application Priority Data
Nov. 29, 2019  (KR) .................. 10-2019-0156760

(51) Int. Cl.
*A23L 29/30*  (2016.01)
*A23B 2/779*  (2025.01)
(Continued)

(52) U.S. Cl.
CPC .............. *A23L 29/30* (2016.08); *A23B 2/779* (2025.01); *A23L 5/20* (2016.08); *A23L 27/33* (2016.08)

(58) Field of Classification Search
None
See application file for complete search history.

(56) References Cited

U.S. PATENT DOCUMENTS

| 11,084,805 B2 | 8/2021 | Kim et al. |
| 2018/0049458 A1 | 2/2018 | Woodyer et al. |

(Continued)

FOREIGN PATENT DOCUMENTS

| CN | 1528916 A | 9/2004 |
| CN | 111989337 A | 11/2020 |

(Continued)

OTHER PUBLICATIONS

Stack Exchange, What types of glycosidic bonds are in oligosaccharides that occurs naturally not in the lab?, StackExchange: Chemistry. Jan. 7, 2017<https://chemistry.stackexchange.com/questions/65832/what-types-of-glycosidic-bonds-are-in-oligosaccharides-that-occurs-naturally-not> (Year: 2017).*

(Continued)

*Primary Examiner* — Viren A Thakur
*Assistant Examiner* — Thanh H Nguyen
(74) *Attorney, Agent, or Firm* — Seed Intellectual Property Law Group LLP

(57) ABSTRACT

Provided is novel use of an allulose disaccharide.

13 Claims, 3 Drawing Sheets

6-O-β-D-Psicopyranosyl-α-D-psicofuranose

6-O-β-D-Psicopyranosyl-β-D-psicofuranose

(51) Int. Cl.
*A23L 5/20* (2016.01)
*A23L 27/30* (2016.01)

(56) References Cited

U.S. PATENT DOCUMENTS

| | | |
|---|---|---|
| 2018/0327796 A1 | 11/2018 | Lee et al. |
| 2019/0328014 A1 | 10/2019 | Boit et al. |
| 2023/0002434 A1 | 1/2023 | Kim et al. |

FOREIGN PATENT DOCUMENTS

| | | |
|---|---|---|
| CO | 2022009062 A1 | 7/2022 |
| EP | 4 046 498 A1 | 8/2022 |
| JP | 10-234359 A | 9/1998 |
| JP | 2005-110675 A | 4/2005 |
| JP | 2010-124824 A | 6/2010 |
| JP | 2011-037821 A | 2/2011 |
| JP | 2011-062196 A | 3/2011 |
| KR | 10-2016-0041380 A | 4/2016 |
| KR | 10-2019-0049499 A | 5/2019 |
| KR | 10-2019-0100222 A | 8/2019 |
| KR | 10-2019-0101389 A | 8/2019 |
| WO | 2012/113405 A1 | 8/2012 |
| WO | 2018/127669 A1 | 7/2018 |
| WO | 2019/156483 A1 | 8/2019 |

OTHER PUBLICATIONS

Vollhardt et al., 24.1: Names and Structures of Carbohydrates, Organic Chemistry. LibreTexts, p. 1-18 (Year: 2024).*

Abraham et al., "Toxicology and risk assessment of 5-Hydroxymethylfurfural in food," *Mol. Nutr. Food Res.* 55:667-678 (2011).

Friedman, "Food Browning and Its Prevention: An Overview," *J. Agric. Food Chem.* 44(3):631-653 (1996).

Kowalski et al., "5-Hydroxymethyl-2-Furfural (HMF)—Heat-Induced Formation, Occurrence in Food and Biotransformation—a Review," *Pol. J. Food Nutr. Sci.* 63(4):207-225 (2013).

Morimoto et al., "Production and application of a rare disaccharide using sucrose phosphorylase from *Leuconostoc mesenteroides*," *Journal of Bioscience and Bioengineering* 119(6):652-656 (2015).

Oshima et al., "Synthesis and Structure Analysis of Novel Disaccharides Containing D-Psicose Produced by Endo-1,4-β-D-Xylanase from *Aspergillus sojae*," *Journal of Bioscience and Bioengineering* 101(3):280-283 (2006).

U.S. Appl. No. 17/779,043, filed May 23, 2022.

* cited by examiner

[FIG. 1]
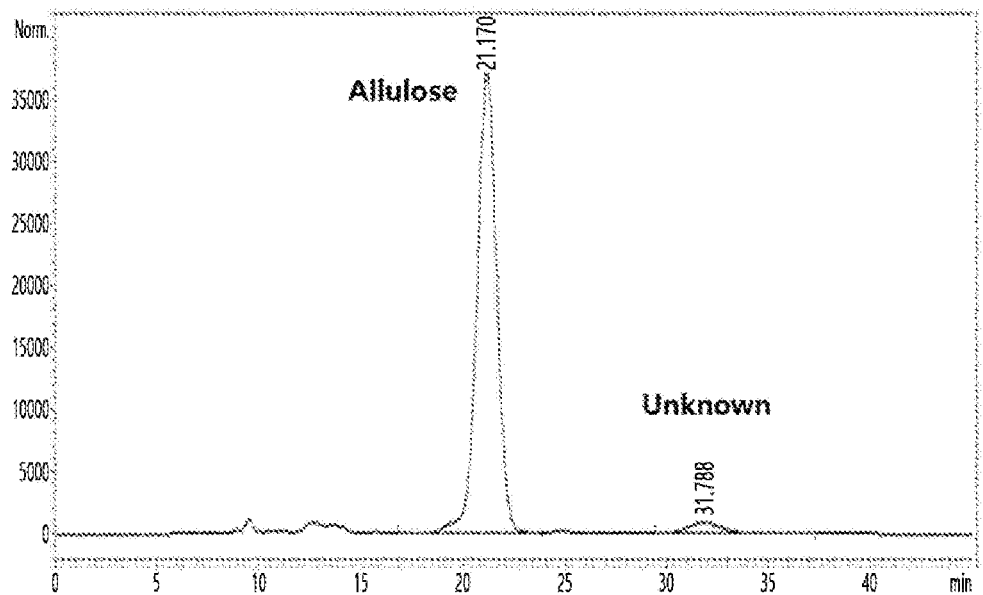
[FIG. 2]
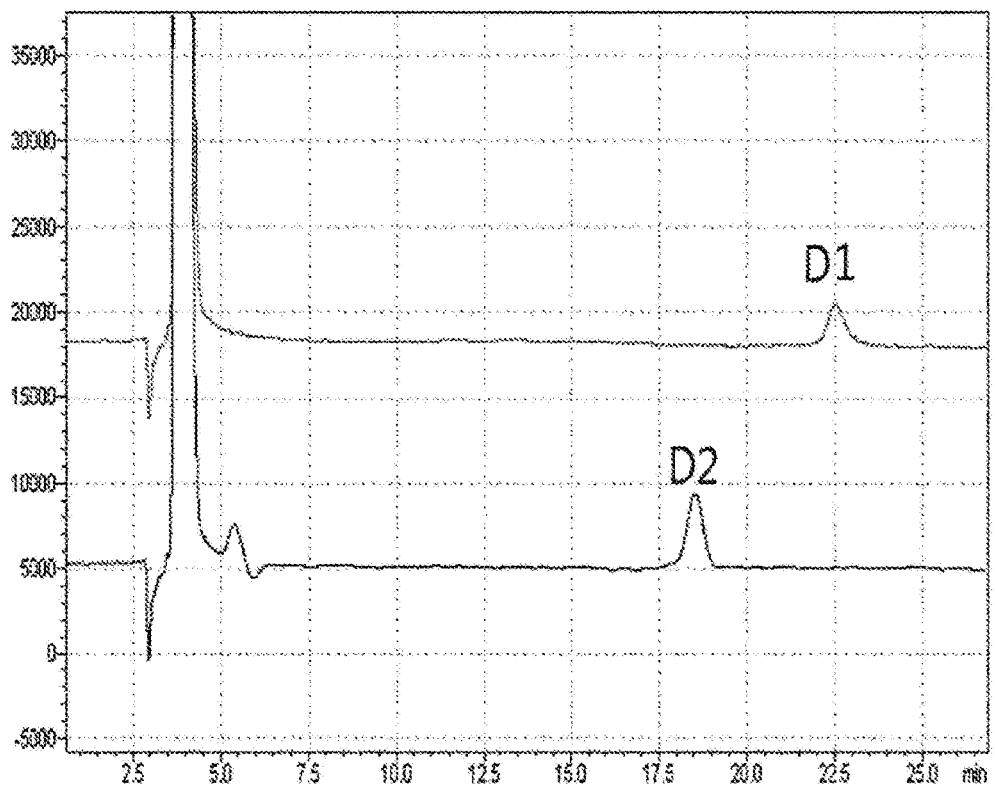

[FIG. 3]
Major
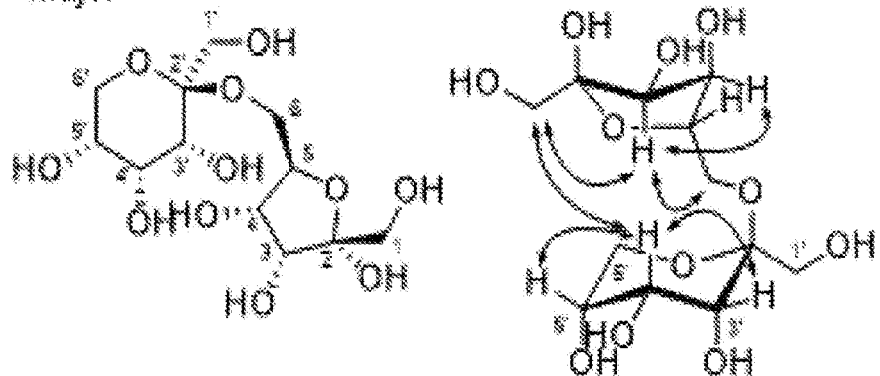
6-O-β-D-Psicopyranosyl-α-D-psicofuranose
Minor
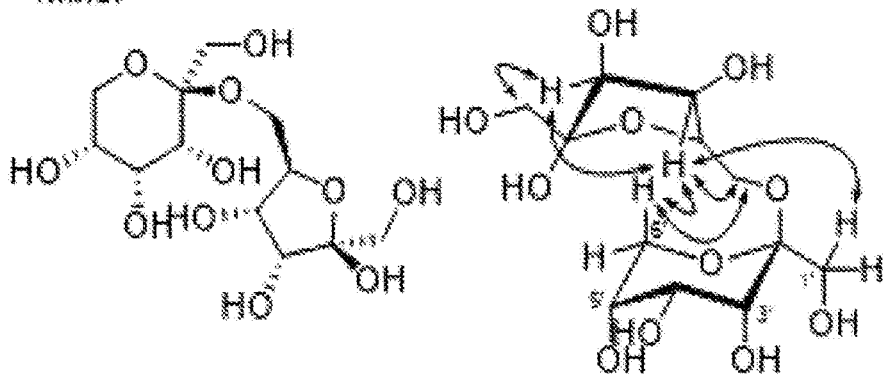
6-O-β-D-Psicopyranosyl-β-D-psicofuranose

[FIG. 4]
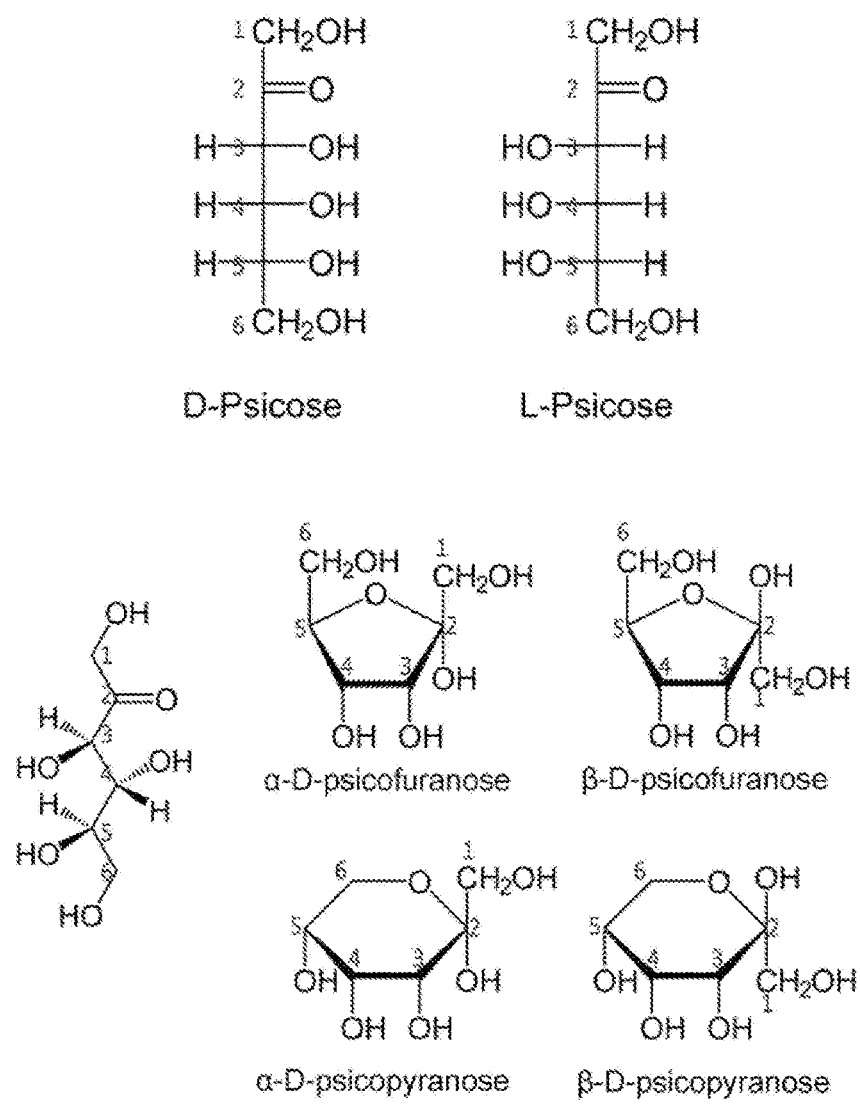

COMPOSITION FOR INHIBITING HMF PRODUCTION COMPRISING ALLULOSE DISACCHARIDE

BACKGROUND OF THE INVENTION

1. Field of the Invention

The present disclosure relates to novel use of an allulose disaccharide.

2. Description of the Related Art

Hydroxymethylfurfural (HMF) is an organic compound formed by dehydration of a compound containing an aldehyde group and a hydroxyl group, and is a white, low-melting compound which is highly soluble in both water and organic solvents. The high generation of HMF indicates deterioration of freshness during product processing and distribution, deterioration of quality due to accumulation of heat damage, and furthermore, a high possibility of continuous induction of non-enzymatic browning. Moreover, there are still unidentified negative concerns about HMF in view of a risk to human health, such as the issue of carcinogenicity (Abraham K. (2011) Toxicology and risk assessment of 5-Hydroxymethylfurfural in food, *Molecular Nutrition & Food Research.* 55(5):667-678).

Thermal sterilization is most commonly used in food processing. However, since foods containing sugars generate HMF when heated, as described above, it is an important issue to reduce the generation of HMF.

To solve these problems, research has been conducted on stabilization of product quality by suppressing HMF generation, as reported in Food Browning and Its Prevention: An Overview. *J. Agric. Food Chem.*, Vol. 44, No. 3, etc., but there is a need for research on a method with a better effect. Furthermore, there has been no report of a method of adding carbohydrates.

In view of this technical background, the present inventors isolated a novel compound, and they found that this compound is an allulose disaccharide, and HMF generation is suppressed by adding the allulose disaccharide to a composition including a sugar, thereby completing the present disclosure.

SUMMARY OF THE INVENTION

An object of the present disclosure is to provide a composition for suppressing hydroxymethylfurfural (HMF) generation and/or preventing browning, the composition including an allulose disaccharide.

Another object of the present disclosure is to provide a method of suppressing HMF generation and/or preventing browning, the method including preparing a composition including a sugar and the allulose disaccharide.

Still another object of the present disclosure is to provide a method of preparing a composition including a sugar, the method including preparing a mixed composition including a sugar and the allulose disaccharide; and heating the mixed composition.

BRIEF DESCRIPTION OF THE DRAWINGS

FIG. 1 shows an HPLC chromatogram of a disaccharide generated during a process of preparing allulose, as analyzed by a column (Biorad Aminex HPX-87C);

FIG. 2 shows an HPLC chromatogram of D1 and D2 which are obtained in a mixture form from the disaccharide generated during the process of preparing allulose, as analyzed by a column (YMC Pack Polyamine II);

FIG. 3 shows a stereoscopic structure of D1 which is an allulose disaccharide; and FIG. 4 shows structures of allulose and numbered carbon atoms thereof.

DETAILED DESCRIPTION OF THE PREFERRED EMBODIMENTS

The present disclosure will be described in detail as follows. Meanwhile, each description and embodiment disclosed in this disclosure may also be applied to other descriptions and embodiments. That is, all combinations of various elements disclosed in this disclosure fall within the scope of the present disclosure. Further, the scope of the present disclosure is not limited by the specific description described below.

Further, those skilled in the art will recognize, or be able to ascertain using no more than routine experimentation, many equivalents to the specific embodiments of the disclosure described herein. Further, these equivalents should be interpreted to fall within the present disclosure.

An aspect of the present disclosure provides a composition for suppressing hydroxymethylfurfural (HMF) generation, the composition including an allulose disaccharide.

The "allulose disaccharide" of the present disclosure may be interchangeably used with the terms "allulose dimer" or "disaccharide allulose", and refers to a compound in which two allulose molecules are linked by a glycosidic bond.

Specifically, the allulose disaccharide may be a compound in which two allulose molecules are linked by a glycosidic bond, the glycosidic bond linking a hydroxyl group at the C2 position of one allulose molecule of the two allulose molecules to a hydroxyl group at any one position of the C1 to C6 positions of the other allulose molecule.

Specifically, the allulose disaccharide may be a compound in which at least one molecule of two allulose molecules is a cyclic allulose, wherein a hydroxyl group at the C2 position of the cyclic allulose is linked to a hydroxyl group at any one position of the C1 to C6 positions of the other allulose molecule by a glycosidic bond. The glycosidic bond may be one glycosidic bond to two glycosidic bonds, specifically one glycosidic bond.

In one embodiment, the bond may be a glycosidic bond between the hydroxyl group at the C2 position of the cyclic allulose and the hydroxyl group at the C6 position of the other allulose.

In one embodiment, one molecule of the two allulose molecules is in the form of psicofuranose, and the other molecule is in the form of psicopyranose. In one embodiment, it may be a compound represented by the following Formula 1, but is not limited thereto.

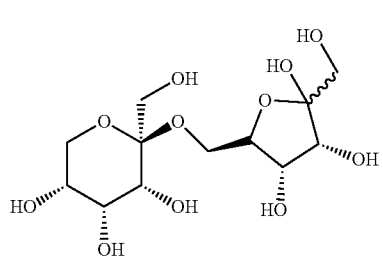

[Formula 1]

In one embodiment, the allulose disaccharide of the present disclosure may be a compound named 2-(hydroxymethyl)-2-((3,4,5-trihydroxy-5-(hydroxymethyl)tetrahydrofuran-2-yl)methoxy)tetrahydro-2H-pyran-3,4,5-triol, more specifically, a compound named (2S,3R,4R,5R)-2-(hydroxymethyl)-2-(((2R,3S,4R)-3,4,5-trihydroxy-5-(hydroxymethyl)tetrahydrofuran-2-yl)methoxy)tetrahydro-2H-pyran-3,4,5-triol, but is not limited thereto.

In one embodiment, the allulose disaccharide of the present disclosure may be a compound named 2-(hydroxymethyl)-2-((3,4,5-trihydroxy-5-(hydroxymethyl)tetrahydrofuran-2-yl)methoxy)tetrahydro-2H-pyran-3,4,5-triol, and more specifically, a compound named (2S,3R,4R,5R)-2-(hydroxymethyl)-2-(((2R,3S,4R)-3,4,5-trihydroxy-5-(hydroxymethyl)tetrahydrofuran-2-yl)methoxy)tetrahydro-2H-pyran-3,4,5-triol, but is not limited thereto.

The (2S,3R,4R,5R)-2-(hydroxymethyl)-2-(((2R,3S,4R)-3,4,5-trihydroxy-5-(hydroxymethyl)tetrahydrofuran-2-yl)methoxy)tetrahydro-2H-pyran-3,4,5-triol may collectively refer to a compound named 6-O-β-D-psicopyranosyl-α-D-psicofuranose or 6-O-β-D-psicopyranosyl-β-D-psicofuranose, according to the form of psicofuranose.

The (2S,3R,4R,5R)-2-(hydroxymethyl)-2-(((2R,3S,4R)-3,4,5-trihydroxy-5-(hydroxymethyl)tetrahydrofuran-2-yl)methoxy)tetrahydro-2H-pyran-3,4,5-triol may be a compound named (2S,3R,4R,5R)-2-(hydroxymethyl)-2-(((2R,3S,4R,5S)-3,4,5-trihydroxy-5-(hydroxymethyl)tetrahydrofuran-2-yl)methoxy)tetrahydro-2H-pyran-3,4,5-triol, or a compound named (2S,3R,4R,5R)-2-(hydroxymethyl)-2-(((2R,3S,4R,5R)-3,4,5-trihydroxy-5-(hydroxymethyl) tetrahydrofuran-2-yl)methoxy)tetrahydro-2H-pyran-3,4,5-triol, but is not limited thereto.

Specifically, the compound of Formula 1 may exist in two forms of the following Formula 2 and/or Formula 3.

[Formula 2]

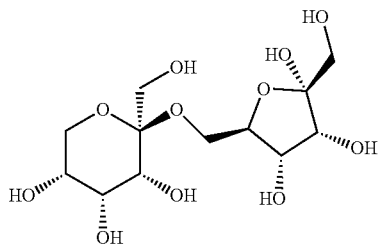

[Formula 3]

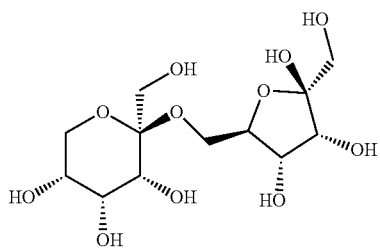

The compound of Formula 2 may be named 6-O-β-D-psicopyranosyl-α-D-psicofuranose, and the compound of Formula 3 may be named 6-O-β-D-psicopyranosyl-β-D-psicofuranose.

The "HMF" of the present disclosure may also be called 5-hydroxymethyl-furfural (5'-HMF), and may have a structure represented by the following Formula 4:

[Formula 4]

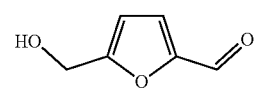

The HMF may be generated from a compound including an aldehyde group and a hydroxyl group.

In the present disclosure, an "HMF-generating material" refers to a compound capable of generating HMF.

The HMF-generating material may include any material without limitation, as long as it includes an aldehyde group and/or a hydroxyl group, and may include, for example, materials such as carbohydrates, glycolipids, glycoproteins, etc.

Specifically, the HMF generation may be caused by a sugar (also expressed as a saccharide). The HMF generation may be caused by sugar decomposition. The sugar decomposition includes sugar decomposition by dehydration.

Specifically, the sugar may be a monosaccharide. The monosaccharide may include any monosaccharide without limitation as long as it is able to generate HMF, such as aldotriose (glyceraldehyde), ketotrose (dihydroxyacetone), aldotetrose (erythrose, threose), ketotetrose (erythrulose), aldopentose (arabinose, lyxose, ribose, xylose (wood sugar, wood saccharide)), ketopentose (ribulose, xylulose), deoxysaccharide (deoxyribose), aldohexose (allose, altrose, galactose, glucose, gulose, idose, mannose, talose), ketohexose (fructose, allulose, sorbose, tagatose), deoxysaccharides (fucose, fuculose, rhamnose), ketoheptose (mannoheptulose, sedoheptulose), etc. The monosaccharide may be specifically hexose, and more specifically allulose, but is not limited thereto.

Meanwhile, a mixture including one or more of the above-described materials may also be included in the HMF-generating material.

The HMF is an example of glycation intermediates. As used herein, the term "glycation product" refers to a product produced by a reaction between an amino group such as a lysine residue of a protein and a reducing sugar without the action of an enzyme, and the glycation product includes all of glycation intermediates and glycation end products. The glycation end products (AGEs) are produced from the glycation intermediates. The glycation end products are brown in color and may generate volatile aroma components, or may refer to various materials produced by reacting blood glucose or degradation products of glucose in the body with various protein components such as hemoglobin, LDL, collagen, etc. The glycation products are representative examples of by-products generated during the processing, storage, and sterilization of compositions including sugars.

The glycation end products, once produced, do not decompose even when the blood glucose is restored to normal levels, and accumulate in the blood or tissues during protein survival. The accumulated glycation end products form cross-linkages with proteins, and interact with receptor for AGEs (RAGEs), leading to accumulation of inflammatory cells.

Therefore, since the generation of the glycation end products, which may have a detrimental effect on the human body, is closely related to the amount of HMF, the allulose disaccharide of the present disclosure may also suppress the generation of the glycation end products by suppressing the generation of HMF.

In other words, another aspect of the present disclosure provides a composition for suppressing the generation of glycation products, the composition including the allulose disaccharide.

Still another aspect of the present disclosure provides a composition for suppressing sugar dehydration, the composition including the allulose disaccharide.

As used herein, the term "dehydration" refers to the entire process in which water is separated from a molecule or between molecules. In the present disclosure, the molecule causing the dehydration reaction may be a sugar molecule.

As used herein, "sugar dehydration" refers to a reaction in which $H_2O$ is produced from a sugar molecule or between sugar molecules. The sugar dehydration may specifically be a reaction in which $H_2O$ is generated from a sugar molecule.

Specifically, the sugar molecule may be a monosaccharide, which is a unit of sugar (glucide). The monosaccharide is the same as described above.

When dehydration occurs in a sugar molecule, other substances derived from the sugar molecule may be produced, in addition to $H_2O$ molecules. For example, the dehydration in a hexose may be a reaction that generates hydroxymethylfurfural, i.e., HMF, in addition to $H_2O$ molecules, as shown in Reaction Scheme 1 below.

these may be used interchangeably in the present disclosure. For example, browning in foods, such as cereals and cereal bars, potato chips, bakery, soda, fruit and vegetable juices, fruit juices, fruit wine, sauces, candy, jellies, jams, ice cream, beer, etc., causes deterioration in quality, leading to loss of flavor, taste, and nutritional value.

Maillard reaction, caramelization reaction, etc. may appear as browning. For example, in the Maillard reaction, a carbonyl group of a sugar and an amino acid group of a protein may react by heating or the like to generate melanoidins. This reaction is also called a melanoidin reaction, named after the reactant, and is also called an aminocarbonyl reaction due to the reactant.

In the intermediate stage of the Maillard reaction, the highly reactive substance HMF is generated, and products in the final stage of the reaction are also highly reactive substances. These substances form a polymer to produce a fluorescent brown pigment, melanoidin. In this process, browning occurs.

As described above, since the HMF generation is closely related to browning of the composition, the allulose disaccharide of the present disclosure may be used for the purpose of preventing browning by inhibiting the HMF generation.

[Reaction Scheme 1]

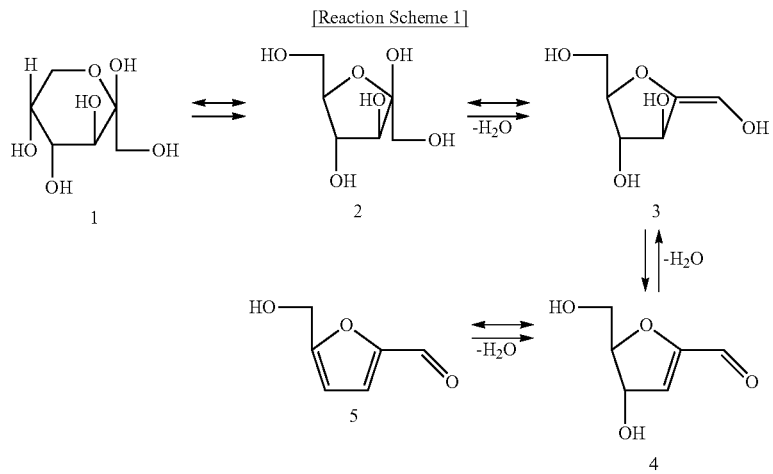

Suppression of sugar dehydration means preventing the above-described sugar dehydration from occurring, or reducing sugar dehydration, as compared with sugar dehydration occurring in an environment in which no allulose disaccharide is present or a relatively small amount thereof is present. Such suppression of sugar dehydration may be confirmed by measuring the amount of sugar dehydration products. For example, whether the sugar dehydration is suppressed or not may be confirmed by measuring the amount of HMF generation.

The dehydration may occur under heating, sterilization, and/or known processing conditions of a composition, but is not limited thereto, and since it also includes a reaction that naturally occurs at room temperature, a reaction that occurs during storage of the composition is also included.

Still another aspect of the present disclosure provides a composition for preventing browning, the composition including the allulose disaccharide.

As used herein, the term "preventing browning" may be used as the meaning including preventing browning from occurring, delaying browning, inhibiting browning, etc., and In other words, the prevention of browning may be due to suppression of HMF generation.

With regard to the content of the allulose disaccharide in the composition, the allulose disaccharide may be included in an amount of more than 0 parts by weight and 15 parts by weight or less, based on 100 parts by weight of the HMF-generating material included in the composition.

Specifically, the allulose disaccharide may be included in an amount of more than 0.0001 parts by weight, more than 0.001 parts by weight, more than 0.01 parts by weight, more than 0.1 parts by weight, or more than 0.15 parts by weight, and 15 parts by weight or less, based on 100 parts by weight of the HMF-generating material, and/or in an amount of 15 parts by weight or less, 13 parts by weight or less, 11 parts by weight or less, 10 parts by weight or less, 9 parts by weight or less, 8 parts by weight or less, 7 parts by weight or less, 6 parts by weight or less, 5 parts by weight or less, 4 parts by weight or less, 3 parts by weight or less, 2 parts by weight or less, or 1 part by weight or less, and more than 0 parts by weight, based on 100 parts by weight of the HMF-generating material, but is not limited thereto.

With regard to the content of the allulose disaccharide in the composition, the allulose disaccharide may be included in an amount of more than 0 parts by weight and 15 parts by weight or less, based on 100 parts by weight of the total sugars included in the composition. Specifically, the allulose disaccharide may be included in an amount of more than 0.0001 parts by weight, more than 0.001 parts by weight, more than 0.01 parts by weight, more than 0.1 parts by weight, or more than 0.15 parts by weight, and 15 parts by weight or less, based on 100 parts by weight of the total sugars, and/or in an amount of 15 parts by weight or less, 13 parts by weight or less, 11 parts by weight or less, 10 parts by weight or less, 9 parts by weight or less, 8 parts by weight or less, 7 parts by weight or less, 6 parts by weight or less, 5 parts by weight or less, 4 parts by weight or less, 3 parts by weight or less, or 2 parts by weight or less, and more than 0 parts by weight, based on 100 parts by weight of the total sugars, but is not limited thereto.

Alternatively, with regard to the content of the allulose disaccharide in the composition, the allulose disaccharide may be included in an amount of more than 0 parts by weight and 15 parts by weight or less, based on 100 parts by weight of the total solids included in the composition. Specifically, the allulose disaccharide may be included in an amount of more than 0.0001 parts by weight, more than 0.001 parts by weight, more than 0.01 parts by weight, more than 0.1 parts by weight, or more than 0.15 parts by weight, and 15 parts by weight or less, based on 100 parts by weight of the total solids, or in an amount of 15 parts by weight or less, 13 parts by weight or less, 11 parts by weight or less, 10 parts by weight or less, 9 parts by weight or less, 8 parts by weight or less, 7 parts by weight or less, 6 parts by weight or less, 5 parts by weight or less, 4 parts by weight or less, 3 parts by weight or less, or 2 parts by weight or less, and more than 0 parts by weight, based on 100 parts by weight of the total solids, but is not limited thereto.

The composition may be a food composition. The food composition of the present disclosure may include general food, health food, and medicinal (or patient) food compositions, but is not limited thereto. Specifically, the food composition of the present disclosure may be a drink (e.g., a carbonated drink, a fruit juice drink, a fruit/vegetable drink, a dietary fiber drink, carbonated water, mixed grain powder, tea, coffee, etc.), an alcohol drink, a bakery product, a sauce (e.g., ketchup, BBQ sauce, etc.), a dairy product (e.g., fermented milk, processed milk, etc.), a processed meat (e.g., ham, sausage, beef jerky, etc.), a chocolate confectionary, a gum, a candy, a jelly, an ice cream, a syrup, a dressing, a snack (e.g., cookie, cracker, biscuit, etc.), a fruit conserve (e.g., fruit preparation, glace fruit, red ginseng juice, sliced red ginseng, etc.). a meal substitution food (e.g., a frozen food, a retort pouch, home meal replacement (HMR), etc.), or a processed food. However, this is only an example, and the food composition is not limited thereto.

The food composition of the present disclosure may include additional ingredients, such as various flavoring agents, natural carbohydrates, etc. The above-described natural carbohydrates may include monosaccharides such as glucose and fructose, disaccharides such as maltose and sucrose, polysaccharides such as dextrin and cyclodextrin, and sugar alcohols such as xylitol, sorbitol, erythritol, etc. As a sweetener, a natural sweetener such as thaumatin and stevia extract, a synthetic sweetener such as sucralose, saccharin, and aspartame, etc. may be used.

In addition to the ingredients described above, the food composition of the present disclosure may include various nutritional supplements, vitamins, minerals, flavors, colorants, pectin and salts thereof, alginic acid and salts thereof, organic acids, protective colloid thickeners, pH adjusters, stabilizers, preservatives, glycerin, alcohols, carbonating agents used in carbonated drinks, and the like. In addition, the food composition of the present disclosure may include flash of fruits for the preparation of natural fruit juices, fruit juice beverages, and vegetable drinks. These ingredients may be used alone or in combination thereof. The substances commonly included in the food composition may be appropriately selected and added by those skilled in the art, and a proportion of the additive may be selected from the range of 0.001 parts by weight to 1 part by weight, or 0.01 parts by weight to 0.20 parts by weight, based on 100 parts by weight of the food composition of the present disclosure, but is not limited thereto.

Still another aspect of the present disclosure provides a method of suppressing HMF generation, the method including preparing the composition including a sugar and the allulose disaccharide.

As used herein, the "preparing" includes any method without limitation as long as it is able to provide the composition including a sugar and the allulose disaccharide. In other words, the preparing includes any method that allows the composition to include sugars and the allulose disaccharide. For example, the preparing the composition including a sugar and the allulose disaccharide may include adding the allulose disaccharide to a composition including a sugar, adding sugars to a composition including the allulose disaccharide, and generating the allulose disaccharide during preparation of sugars/sugar composition.

The composition may include other components without limitation, as long as it includes sugars and the allulose disaccharide.

Meanwhile, the composition including a sugar and the allulose disaccharide may also be called a "mixed composition (mixture)". In the mixed composition, the "sugars" other than the allulose disaccharide may include allulose, but are not limited thereto.

The method of suppressing HMF generation may further include heating the composition after preparing the composition including a sugar and the allulose disaccharide. However, the method is not limited thereto, and the heating may be performed before, after, or simultaneously with preparing the mixed composition.

The heating may be performed within an appropriate range of temperature depending on the type of composition, and the range of temperature, the heating time, the sterilization method, etc. may be appropriately performed by a person skilled in the art, based on information known in the art. Specifically, it may be performed at a temperature of 60° C. or higher and 100° C. or lower, more specifically 60° C. or higher and 95° C. or lower, 65° C. or higher and 95° C. or lower, or 70° C. or higher and 95° C. or lower, but is not limited thereto.

The heating may be performed for longer than 0 hour and 108 hours or shorter, specifically, 10 minutes, 20 minutes, 30 minutes, 40 minutes, 50 minutes, 1 hour, 2 hours, 3 hours, 4 hours, 5 hours, 6 hours, 7 hours, 8 hours, 9 hours, 10 hours, 11 hours, or 12 hours or longer, but is not limited thereto.

Still another aspect of the present disclosure provides a method of preparing a composition including a sugar, the method including preparing a mixed composition including a sugar and the allulose disaccharide; and heating the mixed composition.

The heating of the mixed composition may suppress HMF generation, but is not limited thereto.

The heating may be performed before, after, or simultaneously with preparing the mixed composition.

The composition including a sugar, which is prepared by way of the above preparation method, may have a low content of impurities, low generation of HMF, an increased content of allulose, small changes in physical properties thereof, small generation of by-products, low crystallization, low browning reaction, low oxidation/reduction, low conversion of sugars to other materials than the allulose disaccharide, etc. Specifically, the above-described reaction may occur less, as compared with the case of heating a composition including no allulose disaccharide or a composition having a relatively low content of allulose disaccharide compared to the mixed composition under the same conditions, but is not limited thereto.

Still another aspect of the present disclosure provides a method of suppressing sugar dehydration, the method including preparing a composition including a sugar and the allulose disaccharide.

Still another aspect of the present disclosure provides a method of preventing browning, the method including preparing a composition including a sugar and the allulose disaccharide.

Still another aspect of the present disclosure provides a method of sterilizing a composition, the method including preparing the composition including a sugar and the allulose disaccharide.

The method may further include heating the composition, after preparing the composition including a sugar and the allulose disaccharide. However, the method is not limited thereto, and the heating may be performed before, after, or simultaneously with preparing the mixed composition.

The HMF generation, sugar dehydration, preventing browning, sugars, and heating are the same as described above.

The composition may be, for example, a food composition, but is not limited thereto.

The food is the same as described above.

Still another aspect of the present disclosure provides a composition for suppressing denaturation of sugars, the composition including the allulose disaccharide.

Still another aspect of the present disclosure provides a method of suppressing denaturation of the composition, the method including preparing a composition including a sugar and the allulose disaccharide.

The method may further include heating the composition, after preparing the composition including a sugar and the allulose disaccharide. However, the method is not limited thereto, and the heating may be performed before, after, or simultaneously with preparing the mixed composition.

The allulose disaccharide, sugars, and heating are the same as described above.

The denaturation includes conversion of sugars to other substances, such as crystallization, browning, oxidation/reduction, etc., change of physical properties thereof, or generation of by-products, but is not limited thereto.

Still another aspect of the present disclosure provides use of the allulose disaccharide in suppressing HMF generation.

The allulose disaccharide and the suppressing HMF generation are the same as described above.

Hereinafter, the present disclosure will be described in more detail with reference to Examples and Experimental Examples. However, these Examples and Experimental Examples are for illustrative purposes only, and the scope of the present disclosure is not intended to be limited by these Examples and Experimental Examples.

Example 1: Separation of Novel Allulose Disaccharide

A disaccharide was separated through HPLC according to an allulose preparation process disclosed in US 2018-0327796 A1. In detail, it was confirmed that a novel (unknown) substance, in addition to allulose, was generated from an initial solution, as shown in FIG. 1, under the HPLC chromatogram analysis conditions in Table 1 below.

Although the amount of the novel substance separated as described above slightly varied according to the preparation process, it was confirmed that the amount of the novel substance contained in the initial solution was 2% or less and increased to about 5% in accordance with storage time.

TABLE 1

| | |
|---|---|
| Equipment | Agilent technologies 1200 series |
| Column | Biorad Aminex HPX-87C (7.8 mm × 300 mm, 9 μm) |
| Eluent | Water |
| Flow rate | 0.6 mL/min |
| Temperature | 80° C. |
| RI cell temperature | 35° C. |

As a result, allulose was identified at 21.1 minutes, and the novel substance was identified at 31.7 minutes.

Thus, in order to separate the generated novel substance, the novel substance was purified at a purity of 95% or more by preparative HPLC and precisely separated by a normal phase column.

Specifically, HPLC chromatography was performed.

Chromatography separation conditions are as shown in Table 2 below.

TABLE 2

| | |
|---|---|
| Equipment | Shimadzu LC 10A |
| Column | YMC Pack Polyamine II (4.6 mm × 250 mm, 5 μm, 12 nm) |
| Eluent | Acetonitrile/Water (80/20) |
| Flow rate | 1 mL/min |
| Temperature | 30° C. |
| RI cell temperature | 30° C. |

As a result, it was confirmed that the substance shown as one peak under the HPLC conditions of Table 1 was observed as two separate peaks under the separation conditions of Table 2 (FIG. 2). The substance of the peak identified at 22.5 minutes was named D1, and the other substance of the peak identified at 17.7 minutes was named D2.

Example 2: Verification of HMF Generation-Suppressing Effect of Allulose Disaccharide

Example 2-1: Comparison of HMF Generation Rate of Allulose Disaccharide

Allulose was selected as a representative example of monosaccharides which are denatured to show high HMF generation when heated. To examine whether the disaccharide (dimer) separated in Example 1 can be applied to several types of foods with different amounts of sugars, the difference was compared by varying the concentration of sugars. Further, in light of the harsher environment in a retort environment (121° C., 15 minutes), which is at the highest temperature among food sterilization conditions, HMF generation rates were compared.

treatment was completed, the samples were taken out and left at room temperature for 10 minutes, and then analyzed using HPLC under the conditions of Table 1 of Example 1.

All experiments were performed in triplicate, and the results are shown in Table 4 below.

TABLE 4

| Sample name | | Concentration (%, w/w) | Sugar composition (based on 100 parts by weight of solids) | | Increase rate of HMF % |
|---|---|---|---|---|---|
| | | | Monomer (Allulose) | Dimer | |
| Comparative Example 1 | (A) | 1 | 93.310 | 1.855 | 182.8% |
| | (B) | 5 | 89.406 | 1.847 | 458.7% |
| | (C) | 10 | 94.167 | 1.897 | 291.5% |
| | (D) | 20 | 92.072 | 1.866 | 337.8% |
| | (E) | 30 | 92.167 | 1.897 | 378.7% |
| | (F) | 50 | 90.453 | 1.872 | 577.5% |
| Experimental Example 1 | (A) | 1 | 97.516 | 0.765 | 114.1% |
| | (B) | 5 | 98.565 | 0.431 | 128.8% |
| | (C) | 10 | 98.560 | 0.449 | 144.7% |
| | (D) | 20 | 98.185 | 0.576 | 156.6% |
| | (E) | 30 | 97.524 | 0.797 | 219.9% |
| | (F) | 50 | 95.695 | 1.533 | 285.4% |

In detail, crystalline allulose (CJ Cheiljedang, purity of 99% or more) with the highest composition ratio of monosaccharides was used, and ultrapure water without impurities was added, and the disaccharide with a purity of 95% or more separated in Example 1 was quantitatively measured to prepare Experimental Example 1 by varying the mixing ratio. In addition, samples (A) to (F) were prepared at concentrations of 1% (w/w), 5% (w/w), 10% (w/w), 20% (w/w), 30% (w/w), and 50% (w/w) by varying the amount of water added to Experimental Example 1 (Table 3).

Meanwhile, in order to compare with the effects of other disaccharides, a representative disaccharide, sucrose was added, instead of the allulose disaccharide, and used as Comparative Example 1. In detail, in the same manner as in Experimental Example 1, the disaccharide sucrose was added to the monosaccharide crystalline allulose in the same ratio as in Experimental Example 1. The ratio of the components was examined using HPLC under the conditions of Table 1. Comparative Example 1 and Experimental Example 1, in which the ratio of the components was confirmed, were prepared at a concentration of 1% (w/w) to 50% (w/w) by dissolving in ultrapure water without impurities.

TABLE 3

| Sample name | Sugar composition (based on 100 parts by weight of solids) | | Mixing ratio | Concentration (%, w/w) | | | | | |
|---|---|---|---|---|---|---|---|---|---|
| | Monomer (Allulose) | Dimer | M:D | (A) | (B) | (C) | (D) | (E) | (F) |
| Comparative Example 1 | 95.214 | 1.904 | 50:1 | 1 | 5 | 10 | 20 | 30 | 50 |
| Experimental Example 1 | 94.855 | 1.901 | 50:1 | 1 | 5 | 10 | 20 | 30 | 50 |

All prepared samples were placed in an autoclave (Jeiotech, ST-105G) and heated at 121° C. for 15 minutes. At this time, the time required for raising the temperature of the equipment was not considered, and after reaching the target temperature, the heating time was measured. After the heat As a result of the experiment, it was confirmed that the increase rate of HMF generation was significantly low in Experimental Example 1 containing a predetermined amount of allulose disaccharide. Although HMF generation was not completely blocked due to the very high heating temperature, stability was significantly enhanced, as compared with Comparative Example 1, in which sucrose as a disaccharide was added in the same ratio, instead of allulose disaccharide, and monosaccharides directly absorbed thermal damage and rapidly decomposed. In other words, as compared with other disaccharides, the allulose disaccharide was confirmed to have a significantly higher effect of delaying deterioration of monosaccharides by heating and protecting monosaccharides.

In addition, in view of concentration, as the high-concentration sample had the larger absolute amount of the monosaccharide, which is the HMF-generating material, the HMF generation was increased under the same heating conditions. However, Experimental Example 1, in which the allulose disaccharide was added, showed significantly small HMF generation and delay of the monosaccharide denaturation, as compared with Comparative Example 1, in which sucrose was added.

These results confirmed that the allulose disaccharide inhibited the dehydration, decomposition, and denaturation of monosaccharides even in a harsh environment of very high temperature, and therefore, the allulose disaccharide may be usefully applied to suppressing the HMF generation and the sugar dehydration.

Example 2-2: Comparison of HMF Generation Rate According to Content of Allulose Disaccharide The disaccharide (dimer) separated in Example 1 was mixed as in Table 5 to prepare samples having different ratios of the disaccharide.

In detail, crystalline allulose (CJ Cheiljedang, purity of 99% or more) with the highest composition ratio of monosaccharides was used, and ultrapure water without impurities was added to prepare a sample at 10% (w/w), which is similar to the average concentration of common beverages, and the sample was used as Experimental Example 2.

Further, the allulose disaccharide with a purity of 95% or more, separated in Example 1, was quantitatively measured and added to crystalline allulose, and dissolved in ultrapure water in the same manner to prepare a sample at a concentration of 10%, which was used in Experimental Examples 3 to 4. The compositions of each of the prepared samples were analyzed again by HPLC under the conditions of Table 1 of Example 1. As shown in Table 5 below, it was confirmed that the amount of disaccharide included therein was different.

TABLE 5

| Sample name | Sugar composition (based on 100 parts by weight of solids) | | | Mixing ratio Monomer: Dimer | Concentration (%, w/w) |
| --- | --- | --- | --- | --- | --- |
|  | Monomer | Dimer | Others |  |  |
| Experimental Example 2 | 99.823 | 0.158 | 0.019 | 632:1 | 10 |
| Experimental Example 3 | 97.532 | 1.154 | 1.314 | 85:1 | 10 |
| Experimental Example 4 | 95.241 | 2.145 | 2.614 | 44:1 | 10 |

Each of the prepared samples was heated at 95° C., which is the common processing temperature of beverages, and sampled at 20-minute intervals to examine changes in the composition and the amount of HMF generation. Quantification of HMF was analyzed using HPLC under the conditions of Table 1 of Example 1.

All experiments were performed in triplicate, and the results are shown in Table 6 below.

TABLE 6

| Sample name | Heating time (min, 95° C.) | Sugar composition (based on 100 parts by weight of solids) | | Increase rate of HMF % |
| --- | --- | --- | --- | --- |
|  |  | Monomer | Dimer |  |
| Experimental Example 2 | 0 | 99.8a | 0.2a | 100.0% d |
|  | 20 | 99.8b | 0.2b | 110.3% c |
|  | 40 | 99.7c | 0.1c | 120.5% b |
|  | 60 | 99.7d | 0.1d | 128.2% a |
|  | p | 0.000 | 0.000 | 0.000 |
| Experimental Example 3 | 0 | 97.5d | 1.2a | 100.0% d |
|  | 20 | 98.1c | 0.9b | 103.5% c |
|  | 40 | 98.5b | 0.6c | 108.8% b |
|  | 60 | 99.1a | 0.3d | 112.3% a |
|  | p | 0.000 | 0.000 | 0.000 |
| Experimental Example 4 | 0 | 95.2d | 2.1a | 100.0% a |
|  | 20 | 96.3c | 1.6b | 100.0% a |
|  | 40 | 97.4b | 1.0c | 101.3% a |
|  | 60 | 98.5a | 0.4d | 101.3% a |
|  | p | 0.000 | 0.000 | 0.110 |

* The different characters a, b, c, and d in the vertical direction indicate significant differences ($p < 0.05$) according to the heating time in the same sample.

In Experimental Examples 2 to 4, in which a predetermined amount of disaccharide was included, it was confirmed that monosaccharides actually increased while the sufficient amount of disaccharide decomposed by absorbing heat damage. Accordingly, it was confirmed that the increase rate of HMF generated from monosaccharides was also significantly low. In particular, in Experimental Example 4, including the largest amount of disaccharide (including 2.1% (w/w) of the sugar components, including about 0.21% (w/w), based on the total amount of the sample), there was no statistically significant difference in the HMF increase rate even after 60 minutes of heating. Thus, it was confirmed that the effect of suppressing the HMF generation was very high.

These results confirmed that the allulose disaccharide suppresses the dehydration, decomposition, and denaturation of monosaccharides and suppresses the HMF generation. Accordingly, it can be seen that the allulose disaccharide may extremely delay the quality deterioration phenomenon, in which HMF is generated due to denaturation by heat during the common processing and distribution of foods and beverages.

These experimental processes confirmed that when a predetermined amount of disaccharides including allulose is included, HMF generation due to thermal decomposition and denaturation of sugars (allulose) may be significantly delayed.

As compared with the use of traditional additives consisting of different ingredients (e.g., additives such as antioxidants) to suppress HMF generation, the use of disaccharide based on sugars has the advantage of having extremely less influence on the taste and characteristics of products.

Example 3: Identification of Structure of Allulose Disaccharides

To examine the structures of the allulose disaccharides having the function of suppressing HMF generation, the structures of D1 and D2 separated in Example 1 were identified through ESI-MS, $^1$H NMR, and $^{13}$C NMR.

Specifically, the structures were identified by way of the following method.

Major 6-O-β-D-psicopyranosyl-α-D-psicofuranose was a white amorphous powder; ESI-MS m/z 365 [M+Na]$^+$; $^1$H NMR (850 MHz, D20) βH 3.44 (1H, d, J=12.0 Hz), 3.47 (1H, d, J=12.0 Hz), 3.56 (1H, dd, J=11.0 Hz, 5.0 Hz), 3.60 (1H, d, J=12.0 Hz), 3.62 (1H, dd, J=11.0 Hz, 2.5 Hz), 3.70 (1H, br d, J=12.5 Hz), 3.75 (1H, d, J=12.0 Hz), 3.75 (1H, br ma), 3.82 (1H, br d, J=12.5 Hz), 3.84 (1H, br s), 3.92 (1H, t, J=3.0 Hz), 3.97 (1H, d, J=5.5 Hz), 4.09 (1H, t, J=5.5 Hz), 4.13 (1H, br m) [D20 signal δH 4.70]; $^{13}$C NMR signals b δC 57.6, 60.4, 62.9, 64.7, 64.9, 69.1, 68.9, 70.2, 70.3, 81.2, 101.8, 103.4.

Minor 6-O-β-D-psicopyranosyl-β-D-psicofuranose was a white amorphous powder; ESI-MS m/z 365 [M+Na]$^+$; $^1$H NMR (850 MHz, D20) δH 3.49 (1H, d, J=13.0 Hz), 3.73 (1H, d, J=13.0 Hz), 3.58 (1H, ma), 3.68 (1H, dd, J=11.0H, 2.5 Hz), 3.62 (1H, ma), 3.71 (1H, br d, J=12.0 Hz), 3.82 (1H, br d, J=12.0 Hz), 3.76 (1H, br ma), 3.78 (1H, ma), 3.87 (1H, br s), 3.98 (1H, t, J=3.0 Hz), 3.95 (1H, d, J=4.5 Hz), 4.00 (1H, br m), 4.34 (1H, dd, J=8.0 Hz, 4.5 Hz) [D20 signal δH 4.70]; $^{13}$C NMR signals b δC 57.7, 61.4, 62.2, 64.7, 64.8, 69.0, 69.2, 70.8, 74.4, 80.8, 101.8, 105.9.

As a result, it was confirmed that D1 is a novel allulose disaccharide, and has a structure of the following Formula 1.

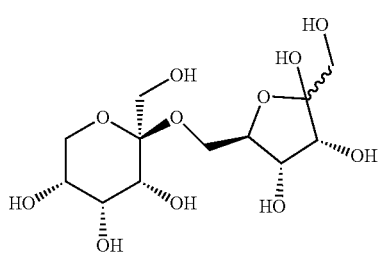

[Formula 1]

It was also confirmed that D1 has two types of major and minor forms (FIG. 3), and the major form, 6-O-βi-D-psicopyranosyl-α-D-psicofuranose, has a structure of the following Formula 2, and the minor form, 6-O-β-D-psicopyranosyl-β-D-psicofuranose, has a structure of the following Formula 3.

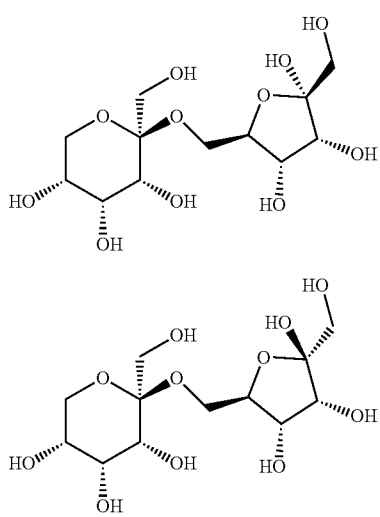

[Formula 2]

[Formula 3]

The compound of Formula 2 (6-O-β-D-psicopyranosyl-α-D-psicofuranose) was named Compound A, and the compound of Formula 3 (6-O-β-D-psicopyranosyl-β-D-psicofuranose) was named Compound B.

Meanwhile, it was confirmed that D2 has a structural isomer relationship with the compound of Formula 1, and is a novel allulose disaccharide, in which the hydroxyl group at the C2 position (according to the carbon numbering of FIG. 4) of allulose is linked to the hydroxyl group at any one of the C1 to C6 positions of the other allulose molecule by a glycosidic bond.

Based on the above description, it will be understood by those skilled in the art that the present disclosure may be implemented in a different specific form without changing the technical spirit or essential characteristics thereof. In this regard, it should be understood that the above embodiment is not limitative, but illustrative in all aspects. The scope of the disclosure is defined by the appended claims rather than by the description preceding them, and therefore all changes and modifications that fall within metes and bounds of the claims, or equivalents of such metes and bounds, are therefore intended to be embraced by the claims.

Effect of the Invention

A composition including an allulose disaccharide of the present disclosure may suppress generation of harmful substances during processing, sterilization, and long-term storage, and may thereby be usefully applied to suppressing sugar dehydration, suppressing HMF generation, and/or preventing browning.

What is claimed is:

1. A method of suppressing hydroxymethylfurfural (HMF) generation caused by a sugar during processing, sterilization, or storage of a composition comprising the sugar, the method comprising preparing a mixed composition including the sugar and an allulose disaccharide prior to or during processing, sterilization or storage of the mixed composition comprising the sugar, wherein the allulose disaccharide is represented by Formula 1 below:

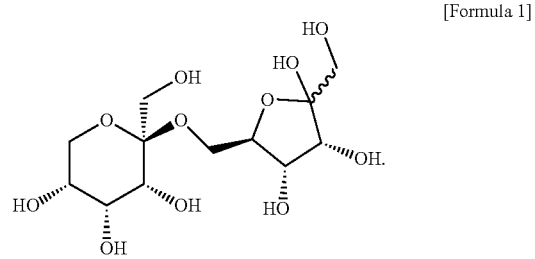 [SMILES: OCC1(O)O[C@H](CO[C@]2(CO)OC[C@@H](O)[C@@H](O)[C@H]2O)[C@@H](O)[C@H]1O]

[Formula 1]

2. The method of claim 1, wherein the allulose disaccharide is represented by Formula 2 or 3 below:

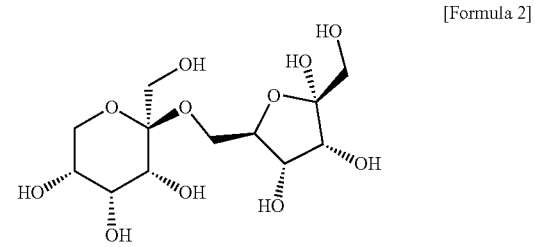

[Formula 2]

-continued

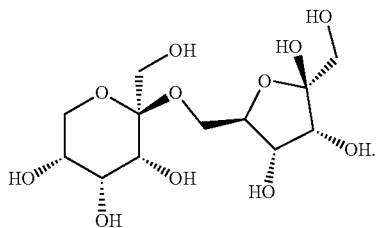
[Formula 3]

3. The method of claim 1, wherein the sugar is a monosaccharide.

4. The method of claim 3, wherein the monosaccharide is allulose.

5. A method of preventing browning of a composition comprising a sugar, the method comprising preparing a mixed composition including the sugar and an allulose disaccharide, prior to or during processing, sterilization or storage of the mixed composition comprising the sugar, wherein the allulose disaccharide is represented by Formula 1 below:

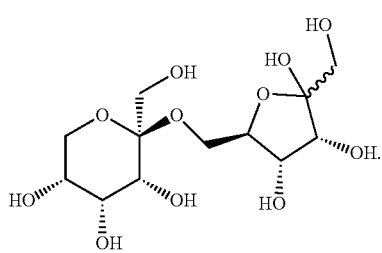
[Formula 1]

6. The method of claim 5, wherein the allulose disaccharide is represented by Formula 2 or 3 below:

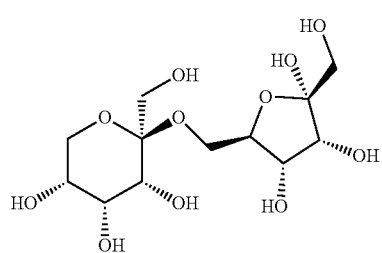
[Formula 2]

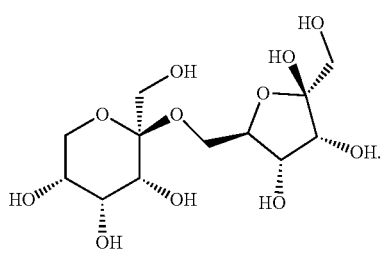
[Formula 3]

7. The method of claim 5, wherein the sugar is a monosaccharide.

8. The method of claim 7, wherein the monosaccharide is allulose.

9. A method of processing a composition including a sugar, the method comprising:
 (a) preparing a mixed composition including the sugar and an allulose disaccharide; and
 (b) heating the mixed composition,
wherein the allulose disaccharide is represented by Formula 1 below:

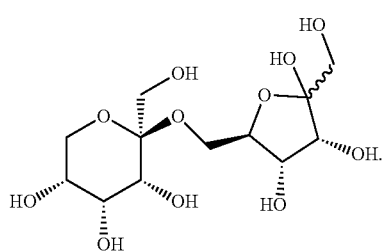
[Formula 1]

10. The method of claim 9, wherein the allulose disaccharide is represented by Formula 2 or 3 below:

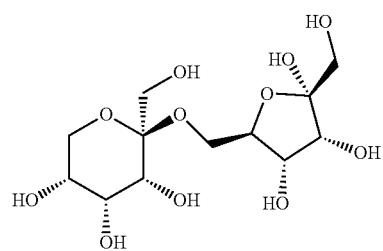
[Formula 2]

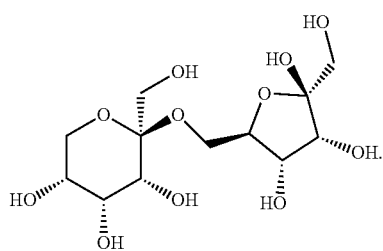
[Formula 3]

11. The method of claim 9, wherein the sugar is a monosaccharide.

12. The method of claim 11, wherein the monosaccharide is allulose.

13. The method of claim 9, wherein the heating of the mixed composition is to suppress HMF generation.

* * * * *